UNITED STATES PATENT OFFICE.

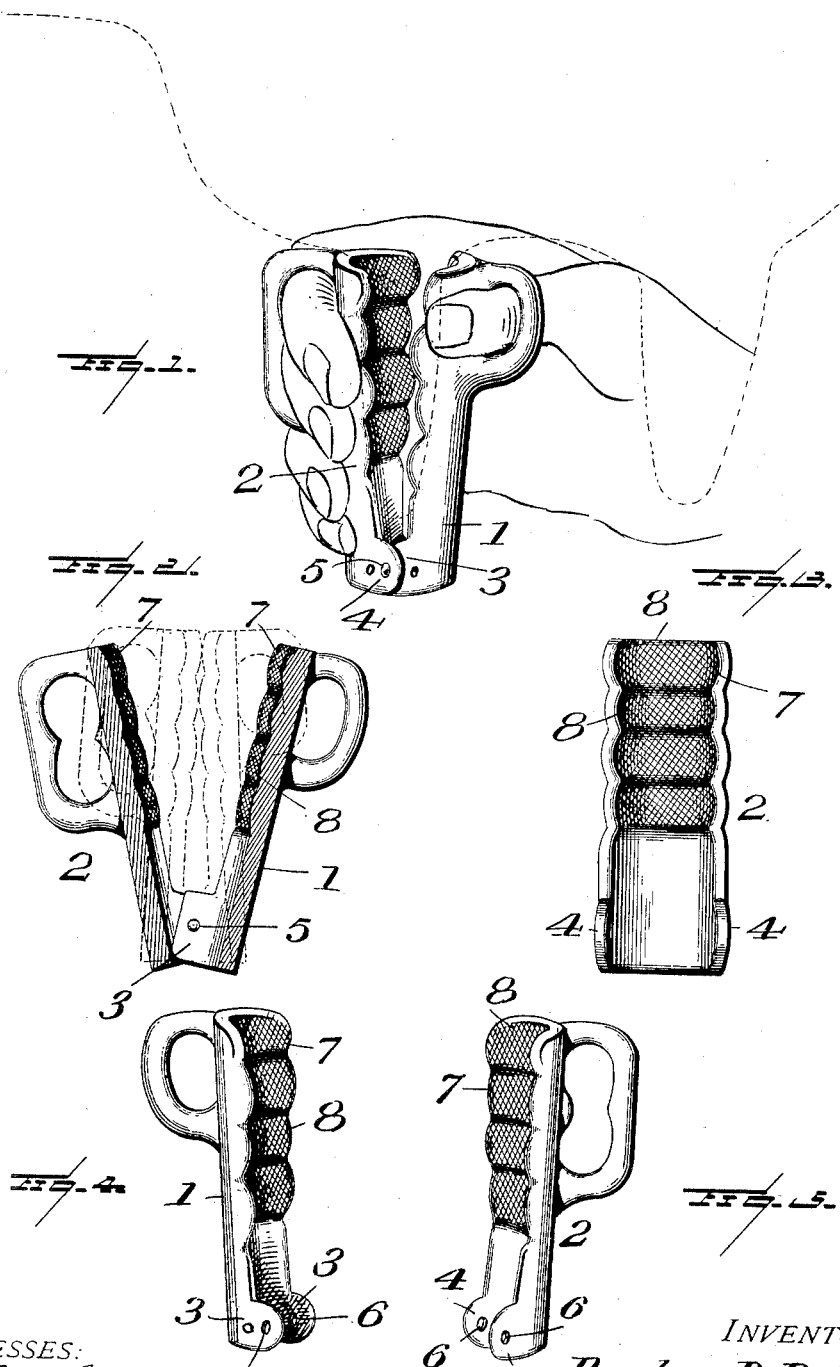

REUBEN D. ROTH, OF MUMMASBURG, PENNSYLVANIA.

COW-MILKER.

SPECIFICATION forming part of Letters Patent No. 675,414, dated June 4, 1901.

Application filed November 2, 1900. Serial No. 35,269. (No model.)

*To all whom it may concern:*

Be it known that I, REUBEN D. ROTH, a citizen of the United States, residing at Mummasburg, in the county of Adams and State of Pennsylvania, have invented a new and useful Cow-Milker, of which the following is a specification.

My invention relates to milking-machines, and more particularly to that class which are adapted to be applied to and manipulated by the hand of the operator; and it has for its object to produce a device of this kind which will be strong and durable and can be applied to either hand, whereby the operation of milking can be performed with less exertion or pressure from the fingers or hand.

With the above object in view my invention consists in the improved construction and novel arrangement of parts of the same, as will be hereinafter more fully set forth.

In the accompanying drawings, in which the same reference-numerals indicate corresponding parts in each of the views in which they occur, Figure 1 is a perspective view of my improved milking-machine in position for use. Fig. 2 is a longitudinal sectional view of the same, the parts being shown open in full lines and closed in dotted lines. Fig. 3 is a transverse sectional view, and Figs. 4 and 5 are perspective detail views.

My improved milking-machine comprises two members 1 and 2, which are hinged or pivotally secured together at one end in any suitable manner, as by means of overlapping ears or projections 3 and 4. A suitable hinge or rivet 5 is passed through perforations 6 in said ears and permits of the upper ends of the two parts being moved toward each other. By providing a series of holes in the ears of one or both of the members the machine may be adjusted so as to be properly applied to teats of different sizes.

The two parts 1 and 2 may be formed from any suitable material, preferably flexible, as vulcanized rubber, which will permit of their being adapted to the purpose for which they are intended. In cross-section they are semicylindrical, so as to partially surround the teat, and the upper ends are provided upon their inner faces with transversely-arranged corrugations 7, which are preferably of different lengths, the alternate corrugations being long enough to cause the ends of one member to overlap the ends of the shorter corrugations of the other member, thereby causing the two members to completely encircle the teat and force out all of the milk. The faces of these corrugations may be plain or smooth; but I prefer to provide them with lines or indentations 8, which may cross or intersect each other in any desired manner.

One of the members is provided at its upper end with a D-shaped handle upon the exterior surface for the reception of the thumb of the operator, and the other member is provided with a substantially B-shaped handle for the reception of two fingers of the operator, said handles being preferably arranged diametrically opposite each other and substantially midway of the circumference of each member, whereby the machine is adapted for use by either hand.

In using my improved milking-machine it is properly adjusted to the size of the teats upon which it is to be used and then placed on the hand of the operator by passing the thumb and fingers through the handles or loops. This will cause the two members to lie directly across the palm of the hand and project a suitable distance above and below the same to avoid the necessity of the hand coming in contact with the udder or the milk. The members are then separated by the movement of the thumb and fingers and placed upon the teat and forced into contact therewith. In this manner the danger of pollution to the milk from contact with the hand of the operator is avoided and more cleanliness is secured. By properly adjusting the parts so that they will completely collapse or close the teat the cow can be milked perfectly dry, thereby avoiding the objection of only partially removing the milk from the udder. It will also milk cleaner than the hand, as it avoids the cavity underneath the thumb and within the palm of the hand. It can be quickly cleansed and will perform the operation of milking with less power and energy than is required with the natural hand.

Having thus fully described my invention, what I claim as new, and desire to secure by Letters Patent, is—

1. In a milking device, the combination, with two substantially semicylindrical members, the upper end of each of which is provided with a holding means and the lower end is provided with a perforated ear projecting from each edge, the ears of one member overlapping those of the other member, and a rivet removably secured in said perforations whereby the device may be adjusted for use, substantially as described.

2. As a new article of manufacture, a milking device comprising two substantially semicylindrical members having perforated overlapping ears at their lower ends and formed upon their inner faces with transversely-extending corrugations and having their edges corrugated at the ends of the transverse corrugations, the alternate corrugations at the edges of the members being of different lengths and so arranged relatively to each other that the ends of the longer corrugations of one member will overlap the shorter corrugations of the other member, a pivot-pin extending through the perforated overlapping ears, and handles carried by the outer sides of each of said members at their upper ends.

REUBEN D. ROTH.

Witnesses:
DENNIS D. ROTH,
ALORA E. ROTH.